United States Patent [19]
Kordesch et al.

[11] 3,847,673
[45] Nov. 12, 1974

[54] HYDRAZINE CONCENTRATION SENSING CELL FOR FUEL CELL ELECTROLYTE

[75] Inventors: Karl V. Kordesch, Lakewood; Milton B. Clark, North Royalton, both of Ohio

[73] Assignee: Union Carbide Corporation, New York, N.Y.

[22] Filed: Aug. 22, 1968

[21] Appl. No.: 754,560

[52] U.S. Cl. ............................................. 136/86 B
[51] Int. Cl. ......................................... H01m 27/00
[58] Field of Search ....................................... 136/86

[56] References Cited
UNITED STATES PATENTS

| | | | |
|---|---|---|---|
| 3,252,837 | 5/1966 | Satterfield et al. | 136/86 E |
| 3,256,116 | 6/1966 | Justi et al. | 136/86 E |
| 3,317,348 | 5/1967 | Winsel | 136/86 E |
| 3,390,015 | 6/1968 | Wilson | 136/86 E |
| 3,410,729 | 11/1968 | Manion | 136/86 E |

Primary Examiner—Winston A. Douglas
Assistant Examiner—H. A. Feeley
Attorney, Agent, or Firm—John R. Doherty

[57] ABSTRACT

A cathodic sensing cell is provided which monitors hydrazine concentration in the electrolyte of a fuel cell. The hydrazine in the electrolyte reacts on the surface of a depolarized cathode lowering the open circuit voltage of the cathode proportional to the amount of hydrazine present. This effect is used to regulate the hydrazine concentration in an operating hydrazine fuel cell.

6 Claims, 5 Drawing Figures

HYDRAZINE CONCENTRATION SENSING CELL FOR FUEL CELL ELECTROLYTE

This invention relates to an electrochemical cell which utilizes hydrazine as a fuel. In one aspect, this invention relates to an improved sensing cell for detecting hydrazine concentration. In a further aspect, this invention is directed to a hydrazine fuel cell system which contains the improved sensing cell.

Fuel cells which employ hydrazine as a fuel have been known for several years. Such fuel cells generally comprise an anode capable of reacting electrochemically with hydrazine with the production of electric current (hereinafter referred to as a "hydrazine anode"), a cathode to which is supplied the oxidant employed in the fuel cell, an electrolyte in contact with the electrodes, means for supplying oxidant to the cathode and means for supplying hydrazine to the anode. The usual method for supplying hydrazine to the anode is by dissolving the hydrazine in the electrolyte, preferably an aqueous alkaline electrolyte.

Prior art hydrazine anodes typically comprised a porous metal or other porous material which was capable of promoting electrochemical decomposition of hydrazine in contact with the anode, for example, porous nickel or porous Raney nickel. In addition, catalytic materials were often deposited on the porous material, generally metals or compounds of metals from Group VIII of the Periodic Table, for example, the noble metals or heavy metal borides such as nickel boride or cobalt boride.

Present methods for monitoring the hydrazine concentration in the electrolyte of a hydrazine fuel cell operate as follows: the total output voltage of the fuel cell battery is monitored and a change in this voltage actuates an electrical switch opening an electromagnetic fuel valve and introduces hydrazine into the electrolyte system. The prime disadvantage of this method is that the net battery voltage invariably includes the cathode potential which tends to vary with time and operating conditions. Also, should there be an over-injection of hydrazine into the system in response to a drop in total battery voltage due, for example, to a slowdown in the electrolyte pumping system or air cooling system, the hydrazine monitoring and injecting system would be unable to recover because of the tendency to inject even more hydrazine to compensate for the decreased voltage, resulting eventually in complete flooding of the system with the hydrazine fuel.

Separate monitoring means for controlling hydrazine concentration which are independent of the main fuel cell battery voltage have also been suggested since such means are not subject to the cumulative effect of a sudden drop in total battery voltage described above. However, such separate monitoring devices, typically a single anode-single cathode hydrazine fuel cell, have a very low sensitivity because the change in voltage with hydrazine concentration for a single cell is relatively small compared to the total battery voltage.

More recently, there has been developed a novel hydrazine sensing cell for monitoring the concentration of hydrazine in a fuel cell electrolyte. This cell is comprised of a first (working) hydrazine anode which is in contact with the hydrazine containing electrolyte and through which current flows when the sensing cell is in operation, a second (reference) hydrazine anode in contact with the electrolyte and means for measuring the potential difference between the two anodes. In response to changes in the potential difference, hydrazine is then added automatically to the electrolyte.

The present invention provides a further type of hydrazine sensing cell which is highly efficient and avoids many of the difficulties and problems associated with prior art devices.

Accordingly, one or more of the following objects will be achieved by the practice of this invention. It is an object of this invention to provide a novel sensing device for monitoring hydrazine concentration in the electrolyte of a fuel cell. Another object of this invention is to provide a sensing cell which is useful in regulating the hydrazine concentration in a hydrazine-air fuel cell. A further object is to provide a cathodic hydrazine sensing cell which is highly efficient and is independent of the main fuel cell battery voltage. These and other objects will readily become apparent to those skilled in the art in the light of the teachings herein set forth.

The objects of the invention and the preferred embodiments thereof will best be understood by reference to the accompanying drawings wherein.

In its broad aspect, the hydrazine sensing cell of this invention comprises a depolarized cathode, which is in contact with the hydrazine-containing electrolyte, an anode also in contact with the hydrazine-containing electrolyte, means for measuring changes in the open circuit voltage of said cell and means for adding hydrazine to said electrolyte in response to a decrease in said open circuit voltage.

It is known that in a working hydrazine-air fuel cell, the electrochemical and chemical reactions are such that the voltage increases with an increasing hydrazine concentration. In such instances the cathode is not in direct contact with the hydrazine-containing electrolyte. However, when a depolarized cathode is in direct contact with hydrazine there is a potential drop rather than a voltage increase and the potential drop is a function of the hydrazine concentration. The present invention utilizes this principle to monitor and/or regulate the hydrazine concentration.

Figure 1:
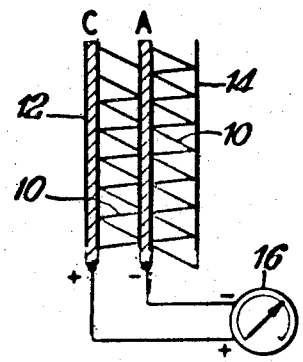
FIGS. 1, 3, 4 and 5 are schematic drawings of various embodiments of the cathodic hydrazine sensing cell of this invention.

The sensing cell shown in FIG. 1 comprises a hydrazine anode A and a cathode C. Anode A and cathode C are preferably separated from each other and from the wall 14 of the sensing cell by spacers 10 which are filled with the fuel cell electrolyte. Spacers 10 can be constructed from most any inert material, as long as they do not impede contact of hydrazine in the electrolyte with cathode C. In the case of a hydrazine-air fuel cell, air or oxygen is supplied to the gas face 12 of cathode C, and hydrazine in the electrolyte flows freely around and between anode A and cathode C.

In general, the sensing cell of this invention can utilize any depolarized cathode, such as an air depolarized cathode, an oxide depolarizer cathode or the like. As hereinafter indicated, the state of charge of certain of the oxide depolarizers may change with time. This can be minimized by the application of a constant current to the cathode.

The air or oxygen cathode can be any of the cathodes known in fuel cell technology, for example, those described in Electrochemical Technology, Vol. 3, No. 5–6, May–June 1965, pages 166–171. Similarly, the hydrazine anode A can be any of the prior art hydrazine anodes. In practice, the electrodes used in the sensing cell are thin, metal-carbon composite electrodes normally used in air electrodes. They can consist of a nickel screen with a teflon-bonded carbon layer or consist of a porous nickel layer bonded to a porous teflon-bonded carbon layer. The electrodes may also be metal catalyzed although this is not necessary.

In some instances it may be desirable to employ a membrane if the sensing cell is operated at hydrazine concentrations greater than 1 percent. The membrane serves to reduce hydrazine access to the cathode C and thereby allows a concentration gradient to exist between the electrode and electrolyte side of the membrane.

Anode A and cathode C are part of a complete electrical circuit which comprises voltmeter 16.

Figure 2:
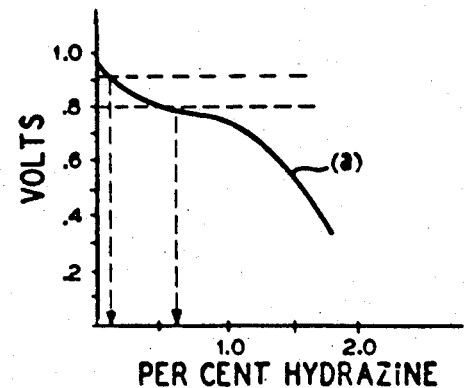
FIG. 2 is a graph depicting the open circuit voltage change of the sensing cell with increasing concentration of hydrazine.

FIG. 2 shows the open circuit voltage change (a) of the sensing cell of FIG. 1 as a function of the hydrazine concentration. The voltage rises in proportion to a decrease in hydrazine concentration. Hence, in order to keep the hydrazine concentration of the electrolyte within a certain range, e.g., between 0.1 and 0.6 percent hydrazine, the switching circuit should be able to be activated between 0.88 and 0.80 volt. A conventional contact voltmeter can be used to start injections of hydrazine into the electrolyte on a voltage rise, and stop when the voltage drops. A sensitivity of ± 5 millivolts is usually sufficient to keep the hydrazine concentration within a narrow range of, for example, 0.3 to 0.4 percent, depending on battery load, electrolyte circulation speed and the like.

As previously indicated, the hydrazine sensing cell of this invention can employ either air-depolarized cathodes or oxide depolarizer cathodes. When either cathode is employed the potential drop is a function of the hydrazine concentration. For example, when mercuric oxide cathodes obtained from commercial HgO/KOH/zinc cells were employed the following potential relationship was observed:

Table I

| HgO Potential (versus Zinc) at Room Temperature | $\Delta V$ |
|---|---|
| 6-N KOH, no Hydrazine: 1.440 volts | =0 mv |
| 6-N KOH, ¼% Hydrazine: 1.420 volts | −20 mv |
| 6-N KOH, ½% Hydrazine: 1.400 volts | −40 mv |
| 6-N KOH, 1% Hydrazine: 1.340 volts | −100 mv |

In a similar manner with fully charged nickel-nickel oxide cathodes obtained from commercial Ni-Cd batteries the following ptential relationship was observed:

Table II

| Nickel Oxide Potential (versus Zinc) at Room Temp. | $\Delta V$ |
|---|---|
| 6-N KOH, no Hydrazine: 1.800 volts | −0 mv |
| 6-N KOH, ¼% Hydrazine: 1.800 volts | −70 mv |
| 6-N KOH, ½% Hydrazine: 1.750 volts | −120 mv |
| 6-N KOH, 1% Hydrazine: 1.700 volts | −170 mv |

Other oxide depolarizer cathodes are also useful in the sensing cell of this invention.

Temperature and potassium hydroxide concentration have only a slight effect on the potential of the oxide depolarized cathode.

It has been observed, however, that the state of charge of oxide depolarizers may change with time. Hence, it may be desirable to apply a cathodic current to the sensing cell and regulate it by means of a voltage-sensitive controller within a range determined by the amount of hydrazine present. It has also been observed that a relationhip exists between the voltage at constant current or the current at constant voltage, both of which can be used for determination of the hydrazine concentrations, depending upon which is the unknown parameter.

Figure 3:
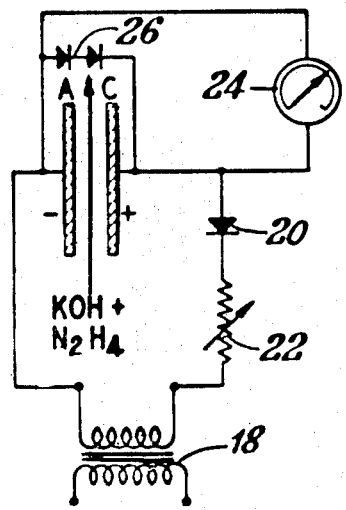

FIG. 3 is a schematic diagram of a control circuit for the automatic adjustment of hydrazine concentration employing a constant current method. The circuit is comprised of a constant current supply 18, a rectifier 20, resister 22 and contact voltmeter 24 which actuates a solenoid injection valve. Cathode C, for example a nickel oxide cathode, and anode A comprise the sensing cell. To avoid overcharging the nickel oxide cathode in the case of hydrazine starvation of the electrolyte, for example due to failure of the injector, it is advantageous to put "overflow diodes" 26 across the sensing cell.

Figure 4:
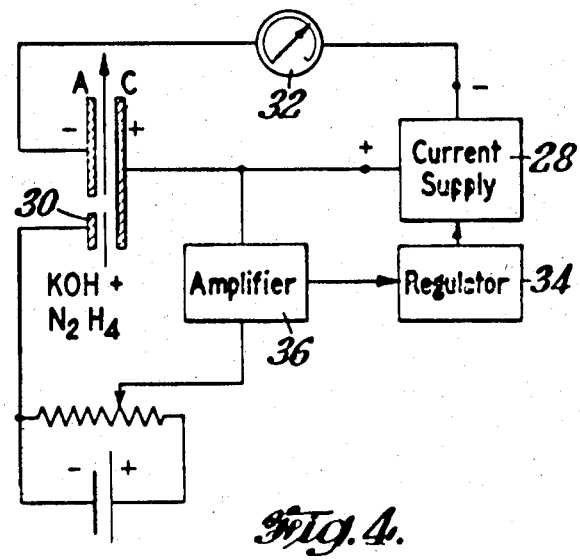

Similarly, as shown in FIG. 4, the voltage may be held constant and the current charge used for signaling the hydrazine level. This method has the advantage of a broader range. However, since the current changes, a "resistance-free" potential reading provides a more accurate indication than the terminal voltage does. A third or reference electrode such as one composed of zinc, may be used for independent measurements. The circuit as set forth in FIG. 4 is comprised of the sensing cell, i.e., cathode C, and anode A, current supply 28, a reference electrode 30, voltmeter 32, regulator 34 and amplifier 36.

Figure 5:
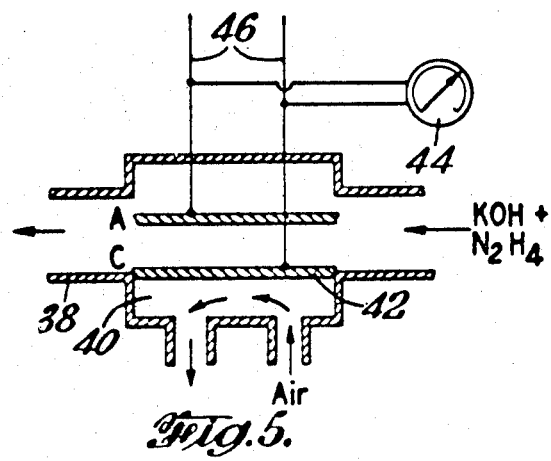

FIG. 5 shows a perferred embodiment of the sensing cell of this invention. A portion of the hydrazine containing electrolyte is bypassed through the sensing cell 38 and over anode A and cathode C. In the sensing cell, air or oxygen enters chamber 40 and passes over surface 42 of cathode C, and finally exits from the chamber. The anode A and cathode C are part of a circuit 46 comprising means for injecting hydrazine into the electrolyte upon a voltage use as measured by voltmeter 44.

The hydrazine sensing cell of this invention is useful in a wide variety of embodiments depending, for example, upon the general type of hydrazine fuel cell battery, whether the battery is intended for portable or stationary operation and whether or not electric power (other than power obtained from the battery) is available.

Although the invention has been illustrated by the preceding examples, it is not to be construed as being limited to the materials employed therein, but rather the invention encompasses the generic area as hereinabove disclosed. Various modifications and embodiments of this invention can be made without departing from the spirit and scope thereof.

What is claimed is:

1. A hydrazine sensing cell for monitoring the concentration of hydrazine dissolved in a fuel cell electrolyte which comprises a depolarized cathode, the surface of which is in contact with said hydrazine-containing electrolyte, a hydrazine anode in contact with said hydrazine-containing electrolyte, means for measuring changes in the open circuit voltage of said cell and means for adding hydrazine to said electrolyte in response to a decrease in said open circuit voltage.

2. The hydrazine sensing cell in accordance with claim 1 wherein said cathode is an air depolarized cathode.

3. The hydrazine sensing cell in accordance with claim 1 wherein said cathode is an oxide depolarizer cathode.

4. The hydrazine sensing cell in accordance with claim 1 wherein said cathode is a mercuric oxide cathode.

5. The hydrazine sensing cell in accordance with claim 1 wherein said cathode is a nickel-nickel oxide cathode or a silver-silver oxide cathode.

6. In a hydrazine fuel cell battery which comprises at least one hydrazine anode, at least one oxidant cathode, an electrolyte in contact with said anode and cathode and containing dissolved hydrazine, and means for supplying oxidant to said oxidant cathode, the improvement which comprises a device for controlling the hydrazine concentration in said electrolyte, said device comprising a depolarized cathode, the surface of which is in contact with said hydrazine-containing electrolyte, a hydrazine anode in contact with said hydrazine containing electrolyte, means for measuring changes in the open circuit voltage of said cell and means for adding hydrazine to said electrolyte in response to a decrease in said open circuit voltage.

* * * * *

UNITED STATES PATENT OFFICE
CERTIFICATE OF CORRECTION

Patent No. 3,847,673  Dated November 12, 1974

Inventor(s) Karl V. Kordesch, et al.

It is certified that error appears in the above-identified patent and that said Letters Patent are hereby corrected as shown below:

Column 3, Table II, 1st line under heading:

"1.800" should read -- 1.870 --

Signed and Sealed this twenty-sixth Day of August 1975

[SEAL]

Attest:

RUTH C. MASON
*Attesting Officer*

C. MARSHALL DANN
*Commissioner of Patents and Trademarks*